No. 664,514.  
Z. G. WARD.  
SCREW PLATE.  
(Application filed Oct. 16, 1900.)  
Patented Dec. 25, 1900.

(No Model.)

WITNESSES  
J. Smigg Poole  
Walter Allen

INVENTOR  
Ziba G. Ward  
by Herbert W. T. Jenner.  
Attorney

UNITED STATES PATENT OFFICE.

ZIBA G. WARD, OF PROFFIT, VIRGINIA.

SCREW-PLATE.

SPECIFICATION forming part of Letters Patent No. 664,514, dated December 25, 1900.

Application filed October 16, 1900. Serial No. 33,187. (No model.)

*To all whom it may concern:*

Be it known that I, ZIBA G. WARD, a citizen of the United States, residing at Proffit, in the county of Albemarle and State of Virginia, have invented certain new and useful Improvements in Screw-Plates; and I do hereby declare the following to be a full, clear, and exact description of the invention, such as will enable others skilled in the art to which it appertains to make and use the same.

This invention relates to screw-plates; and it consists in the novel construction and combination of the parts hereinafter fully described and claimed.

Figure 1:
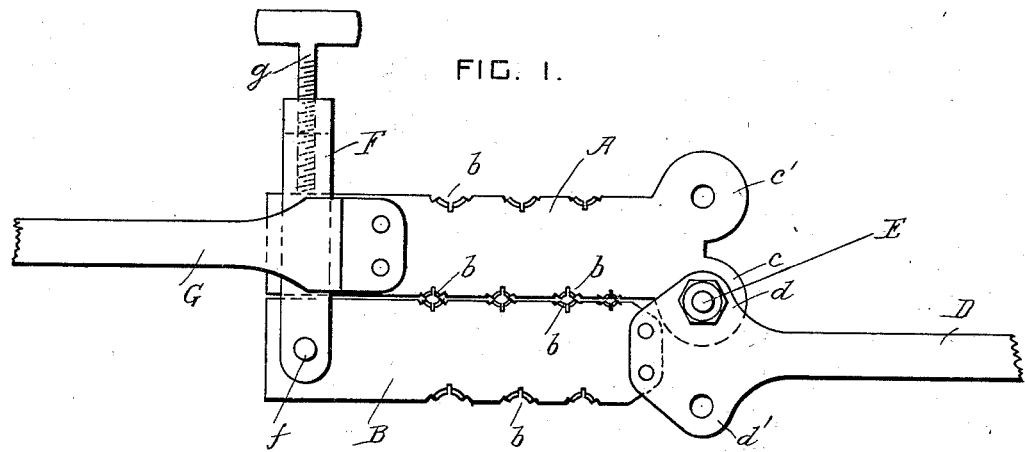
Figure 2:
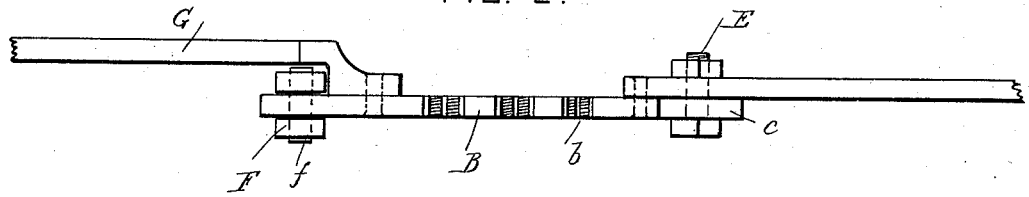
Figure 3:
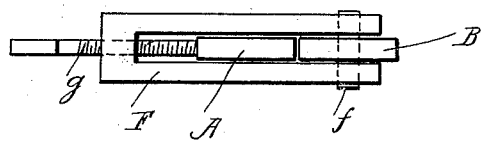

In the drawings, Figure 1 is a plan view of the screw-plate. Fig. 2 is a side view, and Fig. 3 is an end view, of the same.

The screw-plate is made of two parts A and B, which are reversible, and each part is provided with screw-cutting threads $b$ on its edges. The part A is provided with two projecting lugs $c$ and $c'$ at one end. The part B has a handle D at one end, provided with projecting lugs $d$ and $d'$, which overlap the lugs on the part A according to the position of the two parts.

E is a pivot-pin which connects the lug $d$ to the lug $c$. When the parts A and B are reversed, the same pivot-pin is used to connect the lug $d'$ to the lug $c'$.

F is a forked bracket which is pivoted to the opposite end portion of the part B from the handle D by a pin $f$. The bracket F straddles the free end of the part A and is provided with a thumb-screw $g$ for pressing the part A edgewise toward the part B.

G is a cranked handle secured to the part A and projecting across the forked bracket. When the parts A and B are reversed, the forked bracket is swung over on its pivot, so as to engage with the part A when pivoted on the other side of the part B. The cutting-threads $b$ are of various sizes and are arranged to come together in pairs.

What I claim is—

1. In a screw-plate, the combination, with two reversible parts having cutting-threads on their edges, of a pivot connecting the said parts at one end, and a forked bracket pivoted to the other end of one of the said parts and provided with a screw for pressing the two parts together, substantially as set forth.

2. In a screw-plate, the combination, with two reversible parts having cutting-threads on their edges, of a handle secured to the end portion of one part and overlapping the other part in each of its positions, a pin for pivoting the said handle to the other part, a cranked handle secured to one of the said parts, and a forked bracket pivoted to one of the parts at the other end thereof from its pivot and provided with a screw for pressing the two parts together, substantially as set forth.

In testimony whereof I affix my signature in presence of two witnesses.

ZIBA G. WARD.

Witnesses:
WM. F. LONG,
W. P. GLEASON.